July 4, 1967 W. S. WARREN 3,329,470
SYNCHRONIZATION DEVICE FOR TWO OR MORE ROTATABLE COMPONENTS
Filed June 17, 1966 3 Sheets-Sheet 1
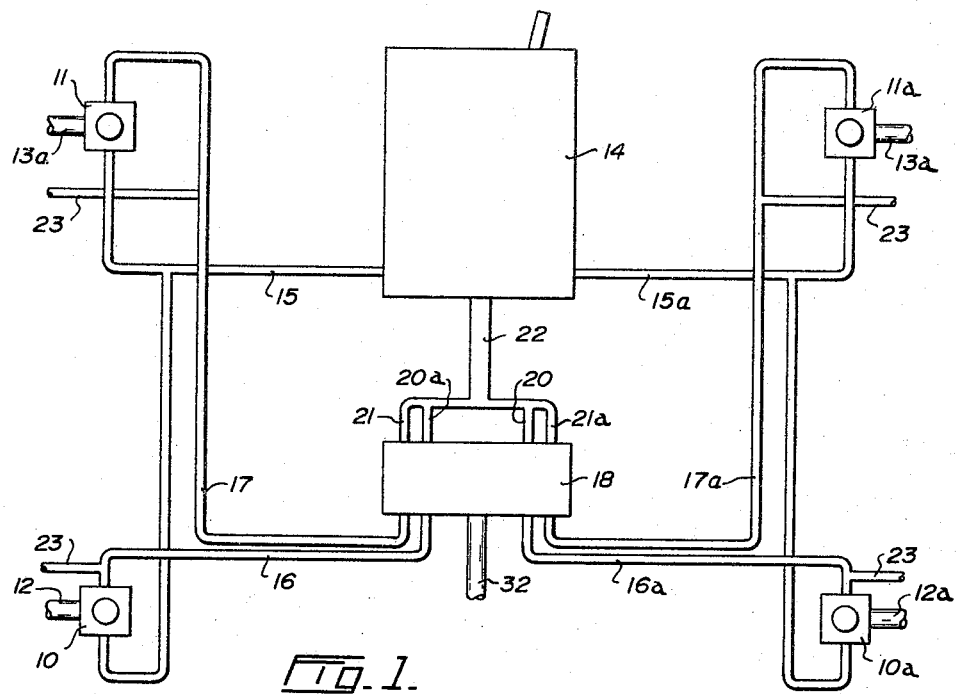
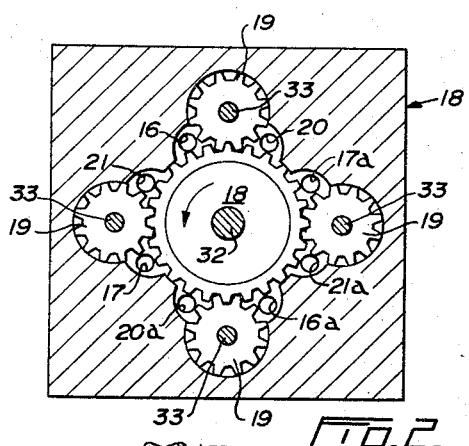
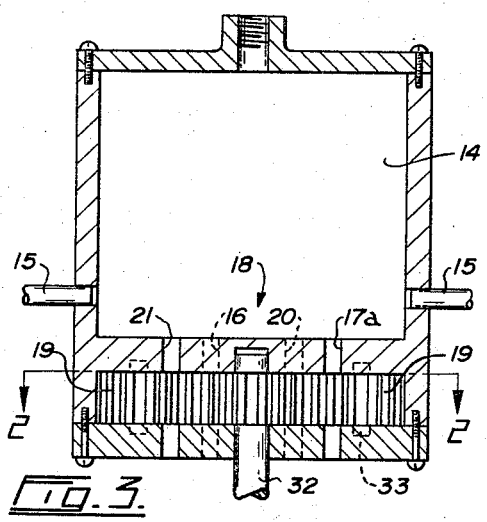
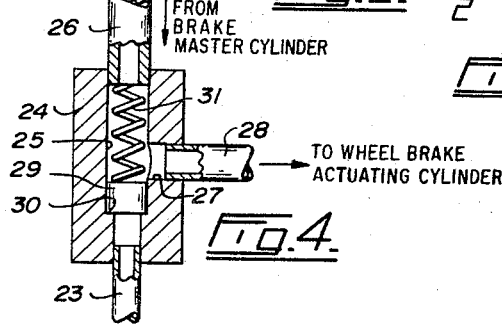
INVENTOR
WALTER S. WARREN
BY
Featherstonhaugh + Kent
ATTORNEYS

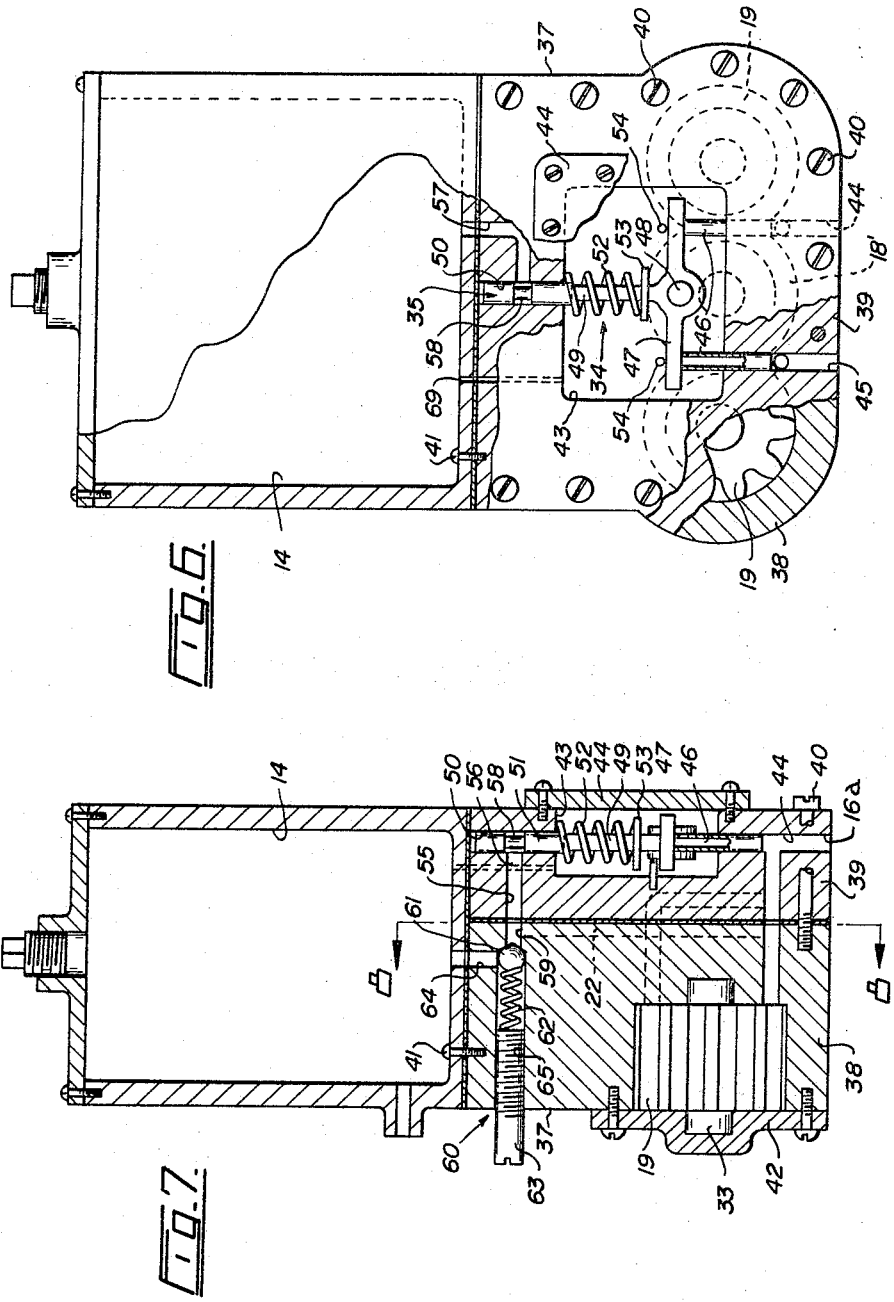

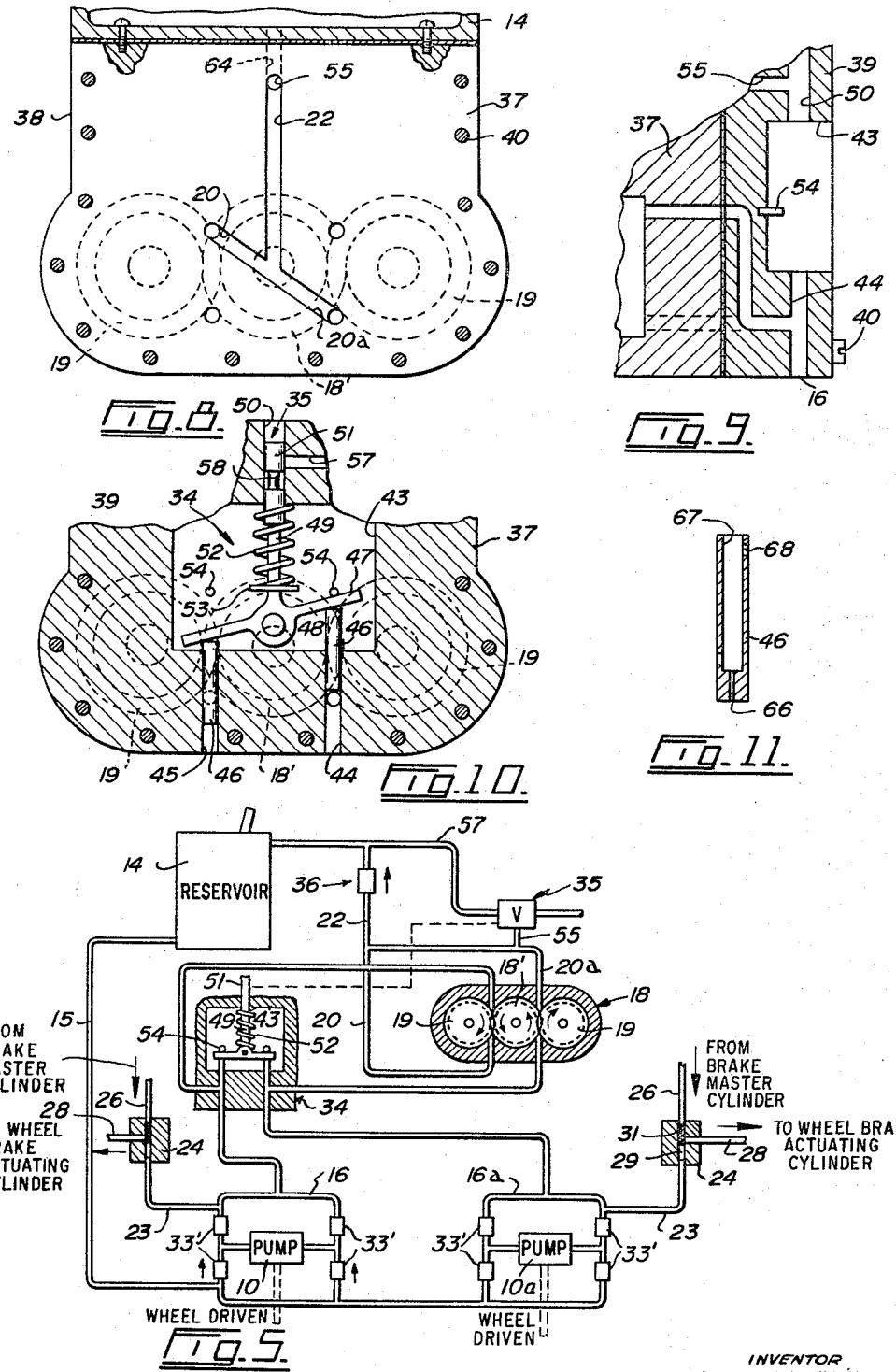

United States Patent Office 3,329,470
Patented July 4, 1967

3,329,470
SYNCHRONIZATION DEVICE FOR TWO OR
MORE ROTATABLE COMPONENTS
Walter S. Warren, P.O. Box 210, Rte. 4, Saskatoon,
Saskatchewan, Canada
Filed June 17, 1966, Ser. No. 558,311
10 Claims. (Cl. 303—21)

This invention relates to new and useful improvements in devices for the synchronization of two or more rotatable components.

While it is primarily designed to stop a drive wheel of a self-propelled vehicle from spinning when it encounters poor traction, nevertheless the same principles could be utilized in the synchronization of engines, turbines and the like.

Attempts have been made in the past to design a device which would stop the drive wheel of a self-propelled vehicle from spinning when it encounters poor traction while the other wheel is on firm traction. Individually operated wheel brakes are used on most tractors and heavy duty equipment. However, for reasons of safety the majority of other vehicles do not use independent wheel brakes.

The present device provides a completely automatic wheel brake system which can be utilized for self-propelled vehicles having two, four, six or more drive wheels.

The device consists essentially of a multi-gear hydraulic idler and an hydraulic pump for each wheel or device requiring synchronization.

The volumes of the streams of fluid flowing through the idler from the pumps must be the same. Therefore if the hydraulic pumps are not revolving at the same speed, an excess of fluid will be pumped into that pressure line, between the pump and the idler, of the pump with the higher r.p.m.

At any given r.p.m. the volumes from the two hydraulic pumps are the same, hence there is then no excessive fluid in either line, but the moment that the r.p.m. of one pump changes to the other, an excess of fluid results.

If this excess fluid is piped to a shuttle valve in the brake lines, this fluid can be utilized to automatically actuate the wheel brake thereby stopping that particular drive wheel from spinning.

If one wheel stops or nearly stops, while the other wheel is revolving quite rapidly, one piston in the high speed cutout component will be pushed down by a spring thereby closing the by-pass valve and forcing the fluid flowing through the idler to become pressurized to a value determined by the setting of the pressure regulator.

Although this system incorporates the means whereby it becomes inoperative at higher speeds, it may be desirable in some application to have it operative at all times. Should this be the case, it is only necessary to omit the by-pass valve in the automatic high speed cutout component from the system. The system is also designed to operate in reverse but if this is not a desired feature, the one-way valve at each hydraulic pump can be dispensed with and straight through piping can be used.

Because the volume of hydraulic fluid used to actuate hydraulic brakes is quite small, the size of pump to be used could be the smallest size available and the size of the idler gears should also be fairly small.

A certain amount of internal fluid leakage is not objectionable since it is not desired that the brakes be actuated, for instance, while turning a corner at slow speed. For this reason precision manufacture is not necessary thereby lowering production costs.

The device can readily be atached to existing vehicles as the majority of the construction may be contained in a relatively small unit which can be secured to the chassis of a vehicle in any conventional location.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a schematic view of the invention used on a four wheel drive vehicle.

FIGURE 2 is an enlarged cross sectional view of the idler gear assembly, substantially along the line 2—2 of FIGURE 3.

FIGURE 3 is a side section of FIGURE 2.

FIGURE 4 is an enlarged cross sectional view showing one form of shuttle valve for use in conjunction with the brake system.

FIGURE 5 is a schematic view of the invention utilizing the high speed cutout component.

FIGURE 6 is an enlarged partially sectioned view of the device.

FIGURE 7 is a cross sectional view at right angles to FIGURE 6.

FIGURE 8 is a fragmentary sectional view along the line 8—8 of FIGURE 7.

FIGURE 9 is an enlarged fragmentary cross sectional view showing the porting of one inlet.

FIGURE 10 is an enlarged cross sectional view showing one position of the high speed cutout component.

FIGURE 11 is an enlarged cross sectional view of one of the piston plungers.

In the drawings like characters of reference indicate corresponding parts in the different figures.

Proceeding therefore to describe the invention in detail, reference should first be made to FIGURES 1, 2 and 3 in which reference character 10, 10a, 11 and 11a, represent hydraulic pumps connected to and driven by the drive shafts 12, 12a, 13 and 13a respectively. The schematic view in FIGURE 1 shows the device incorporated with a four wheel drive vehicle but, of course, it will be appreciated that the principles of operation are similar for two, four or six wheeled drive vehicles.

A reservoir 14 contains hydraulic fluid and conduits 15 and 15a extend from the reservoir to the inlet sides of each of the hydraulic pumps.

Outlet conduits 16, 16a and 17, 17a extend from the outlet side of the hydraulic pumps to the idler gear assembly 18 and FIGURE 2 shows a cross section of this idler gear assembly with the inlets identified by the same reference characters as the outlet conduits hereinabove described.

The idler gear assembly consists of a master gear 18' and an auxiliary gear 19 for each hydraulic pump and the inlets 16, 16a, and 17, 17a, enter the idler gear assembly at what I define as the inlet locus between each auxiliary gear and the master gear as clearly shown in the drawings.

At the outlet locus of each auxiliary gear and master gear is an outlet conduit 20, 20a, and 21, 21a, and these conduits join in a common outlet conduit 22 which returns fluid to the reservoir 14.

Extending from each of the outlet conduits 16, 16a 17, 17a, is a brake line conduit 23 which extends to a shuttle valve assembly shown in FIGURE 4. This shuttle valve assembly consists of a body 24 having a drilling 25 therethrough and the brake line conduit 23 is connected to one end of this drilling 25.

The line 26 from the master cylinder of the brake assembly of the vehicle is connected to the opposite end of drilling 25.

An outlet drilling 27 extends through the wall of the housing or body portion 24 and intersects this drilling 25 medially between the ends thereof and a conduit 28 extends from this drilling 27 to the brake actuating cylinder of the respective wheel brake.

A shuttle valve 29 in the form of a small piston reciprocates within the drilling 25 and normally rests upon shoulders 30, being maintained thereon by means of a spring 31, so that in the situation shown in FIGURE 4, the brake system of the vehicle works normally with the fluid flowing from conduit 26 through conduit 28.

The master gear 18', in this embodiment, is connected to the drive shaft of the vehicle and rotates at the same speed, the master gear being mounted upon spindle 32. The auxiliary gears 19, mounted upon individual axles or spindles 33, are rotated by the engagement of the master gear therewith.

In the operation of this embodiment, the master gear is rotated by the main shaft or drive shaft of the vehicle and assuming the drive wheels are all rotating at the same speed, the hydraulic pumps will be displacing the same volume of fluid which passes through the idler gear assembly and thence to the reservoir.

However, if one wheel commences to slip, more fluid is displaced by the individual hydraulic pump driven by that wheel, and as this fluid cannot pass through the idler gear due to the constant rotation thereof, a pressure build up occurs which acts upon the underside of the shuttle valve piston 29 thus forcing it upwardly against pressure of spring 31. As soon as the shuttle valve clears the drilling 27, this excess hydraulic pressure is conveyed to the wheel brake assembly through conduit 28 thus applying that individual brake and slowing down the wheel until equilibrium is established.

At this time the pressure is equalized and spring 31 returns the shuttle valve piston to the position shown in FIGURE 4.

The same action occurs on any wheel which slips thus automatically correcting the slippage as soon as it occurs.

An example of the above can be illustrated by assuming that the main drive shaft of the vehicle is rotating at 100 r.p.m. and the hydraulic pumps are geared to the wheels to also revolve at 100 r.p.m. and when no slipping is occurring.

If one wheel slips and begins to rotate at 400 r.p.m. while the other three wheels stop, the idler will still be rotating at 100 r.p.m. but the individual pump now operating at 400 r.p.m. has no where to vent the excess fluid which rapidly builds up in pressure and becomes sufficient to overcome the pressure of spring 31 thus actuating the brake of the slipping wheel. The pressure is relieved when the wheels again begin to turn at 100 r.p.m. In actual practice some internal leakage is desirable in order that braking is not initiated at only slight r.p.m. differential as when turning a corner.

In the embodiments illustrated in the remainder of the drawings, a high speed cutout component is incorporated as a safety factor which might be desirable if the device were to be used on automobiles or vehicles travelling at relatively high speeds.

These drawings show the device as suitable for a two wheel drive vehicle but, of course, it will be appreciated that it can be adapted for use with two, four, six or more drive wheels.

Where applicable, similar reference characters have been used to identify corresponding parts.

The schematic view shown in FIGURE 5 includes the reservoir 14, hydraulic pumps 10 and 10a, idler gear 18' and the conduits 15, 16, 16a, 20, 20a and 22. One way valves 33' are situated on each side of the inlet and outlet lines of pumps 10 and 10a.

In this particular embodiment, the high speed cutout device collectively designated 34 is situated within the conduits 16 and 16a.

A by-pass valve assembly collectively designated 35 is operated by the high speed cutout device 34 and an adjustable restrictor valve assembly collectively designated 36 is in circuit with the outlet conduit 22 and the reservoir 14.

In practice, the idler gear assembly 18, the high speed cutout component 34, the by-pass valve assembly 35 and the adjustable restrictor valve 36 together with the reservoir are all incorporated in one unit shown in detail in the remainder of the figures.

The unit consist of a body portion 37 including an idler and restrictor valve housing 38 and a by-pass valve and high speed cutout housing 33 secured together in interfacial relationship by means of screws 40. The reservoir 14 is secured to the top of the body portion 37 by means of screws 41. The master gear 18' and auxiliary gears 19 are situated within the portion 38 and a face plate 42 is secured to this portion of the body and gives support to the ends of spindles or axles 32 and 33.

The drillings and porting for the inlets 16 are shown in detail in FIGURE 9 and are conventional in construction.

FIGURE 8 shows the interconnection of the internal drillings and porting for the outlets from the idler gear assembly and are also conventional in construction.

A chamber 43 is formed in the body portion 39 and is covered by face plate 44'.

This chamber contains the high speed cutout component collectively designated 34. A pair of bores 44 and 45 extend from the base of the chamber downwardly to be connected with the inlet drillings 16 and 16a and a piston plunger 46 reciprocates in each of these bores as shown in FIGURES 6, 7 and 10.

A yoke 47 is mounted upon a transverse pin 48 within the chamber 43 and the arms of this yoke rest upon the upper ends of the piston plungers 46.

Pin 48 is secured to the lower end of a piston rod 49 which extends upwardly and forms part of the aforementioned by-pass valve assembly 35.

A bore 50 extends upwardly from the upper side of chamber 43 and a waisted piston reciprocates within this bore 50 and is connected to the aforementioned piston rod 49.

A spring 52 surrounds piston rod 49 within the chamber 43 and reacts between the upper side of this chamber and a flange or shoulder 53 formed or secured to adjacent the lower end of the piston rod thus normally biasing the piston rod downwardly and hence maintaining the piston plungers 46 at their lowermost position.

Stops 54 limit the upper travel of the yoke and piston plungers 46 to position shown in FIGURE 6.

Extending from the upper end of outlet drilling 22 within the housing 37 is a transverse drilling 55 one end 56 of which communicates with the bore 50.

A further outlet drilling 57 also connects with bore 50 diametrically opposite bore 55 and extends into the reservoir 14.

The waist 58 on the piston 51, when in the position shown in FIGURE 6, connects transverse drilling 55 to drilling 57. However, when the piston moves downwardly so that the waist 58 is not in alignment with drillings 55 and 57, these drillings are closed off one from the other and fluid is forced into the other branch 59 of the transverse drilling 55.

This other branch 59 leads to an adjustable restrictor valve assembly collectively designated 60. It consists of a ball 61 normally maintained upon a seat formed on the end of branch 59, by means of spring 62, the pressure of spring being adjusted by means of the adjusting screw 63.

A further outlet conduit 64 extends from the drilling 65 carrying the adjusting screw, spring, and ball, so that when the ball is pushed from the seating by excess pressure, fluid can flow to the reservoir through branch 59 and outlet drilling 64.

Reference should be made to FIGURE 11 which shows the details of construction of the piston plungers 46. These are provided with a bleed hole 66 within the lower end thereof communicating with the hollow interior 67 which is open at the upper end thereof. Side drilling 68 ensures communication between the bores 44 and 45 and the chamber 43.

In operation and when travelling at relatively low speeds, spring 52 maintains the yoke 47 and the piston plungers 46 in the lowermost position at which time any fluid passing the idler gear assembly, bleeds through the piston plungers into the chamber 43 and thence from the chamber to the reservoir by means of relief drilling 69.

As the r.p.m. of the wheels increases, and assuming no slippage is occurring, the volume of fluid from the pumps 10 and 10a increases together with the pressure thereof thus forcing the piston plungers 46 upwardly together with the yoke 47, so that the yoke engages the stops 54 in the position shown in FIGURE 6. The fluid is then vented through outlet drilling 22, to branch drilling 55, around the waisted piston 51 to the outlet drilling 57.

However, if one wheel slips and the other stops rotating, the situation shown in FIGURE 10 takes place. In this instance the excess pressure generated by the rotating wheel builds up between the idler gear assembly and the pump, thus maintaining the piston plunger within bore 44 in the uppermost position. However, as the other wheel has stopped or is rotating more slowly, the spring 52 causes the yoke to tilt so that the piston plunger within bore 45 moves downwardly to the position shown in FIGURE 10. Any slight rotation of this particular wheel thus causing fluid flow, is bled off through the bleed hole 66 in this particular piston plunger.

Due to the titling of the yoke 47, the waisted piston 51 moves downwardly so that the connection between cross drilling 55 and outlet drilling 57 is cut off. Pressure is built up by the pump of the rotating wheel to the extent where ball valve 61 is moved off the seating and fluid is conveyed through outlet drilling 64 to the reservoir.

By setting ball valve 61 at a relatively high value, above that of the shuttle valve spring 31, fluid will be forced under pressure to operate the brake of the rotating wheel.

As soon as the spinning wheel is braked and the other wheel begins to turn, the speeds are synchronized and the device returns to the position shown in FIGURE 6.

Purely as an example, the following conditions apply. With the vehicle stopped and no flow, there is no hydraulic pressure within the lines and the restrictor valve 61 is closed, and the yoke 47 is in the lowermost position.

At slow speed, there is a slight pressure build up through the hydraulic pumps and this fluid flows through the bleed holes 66 in the piston plungers 46 so that the yoke remains in the lowermost position.

At moderate speed, as an example, having 50 p.s.i. pressure from the pumps, the majority of fluid flows through the idler thus forcing the piston plungers to the uppermost position and the yoke in the position shown in FIGURE 6 so that the restrictor or waisted piston 51 is in the open position and fluid flows to the reservoir through outlet drilling 57.

With one wheel spinning and the other stopped or moving slowly, the yoke tilts as shown in FIGURE 10 thus giving an excess build up of pressure which operates the brake of the spinning wheel thus slowing it down and enabling the wheels to rotate at the same speed at which time it returns to the position shown in FIGURE 6.

In the above embodiment the master gear 18′ can either be freely rotating or alternatively, can be connected to the main drive shaft of the vehicle depending upon the design parameters of the installation.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. A synchronization device for two or more rotatable components having speed control means associated therewith comprising in combination an hydraulic pump for each of said components, a common hydraulic fluid reservoir connected to said pumps, said hydraulic pumps being driven by said components, a pump type idler gear assembly, said idler gear assembly having a master gear and an auxiliary gear for each of said components engaging said master gear, a casing surrounding and enclosing said gears, an inlet conduit extending from each of said hydraulic pumps to the inlet locus of each of said auxiliary gears and said master gear, an outlet conduit extending from the outlet locus of each of said auxiliary gears and said central gear, to said reservoir, and a conduit extending from each of said first mentioned conduits and being operatively connected to said respective speed control means.

2. The device according to claim 1 which includes a source of power for said master gear.

3. An anti-slip device for the drive wheels of vehicles and the like having a source of power, at least two drive shafts and drive wheels connected thereto, and a main shaft connecting said source of power to said drive shaft, a brake system for each of said drive wheels, comprising in combination an hydraulic pump connected to and driven by each of said drive shafts, a body portion, a pump type idler gear assembly in said body portion, said idler gear assembly including a master gear and an auxiliary gear for each of said hydraulic pumps engaging said master gear, an inlet conduit extending from each of said hydraulic pumps to the inlet locus of each of said auxiliary gears and said master gear, an outlet conduit extending from the outlet locus of each of said auxiliary gears and said master gear, to said reservoir, and a conduit extending from each of said first mentioned conduits and being operatively connected to said brake system of each drive wheel.

4. The device according to claim 3 in which said master gear is connected for rotation to said main shaft.

5. The device according to claim 3 which includes spring loaded shuttle valve means also in said body portion and situated between said brake system and said conduit extending to said brake system.

6. The device according to claim 4 which includes spring loaded shuttle valve means also in said body portion and situated between said brake system and said conduit extending to said brake system.

7. The device according to claim 3 which includes a high speed cutout component in said body portion and situated in circuit between said hydraulic pumps and said idler gear assembly, said inlet conduits extending to said high speed cutout component, said high speed cutout component including a chamber, a cylinder bore formed in the base of said chamber for each of said inlet conduits, said inlet conduits connecting to said bores, a piston plunger in each of said cylinder bores, a conduit extending from each bore to said idler gear assembly, said last mentioned conduits being covered by said piston plungers when same are in the lowermost position and uncovered, when said piston plungers are in the uppermost position, a yoke spanning the upper ends of each pair of piston plungers, a piston rod pivotally connected by the lower end thereof to the center of said yoke, and waisted piston on the upper end of said piston rod, a cylinder bore extending upwardly from the upper side of said chamber, said waisted piston engaging said last mentioned bore, spring means normally biasing said last mentioned piston rod downwardly, said outlet conduits extending to said last mentioned bores, a further conduit extending from said bores to said reservoir said waisted piston connecting said outlet conduits to said further conduits when said waisted piston is in the uppermost position and an adjustable restrictor valve between said outlet conduits and said reservoir having a higher release pressure than said shuttle valve means.

8. The device according to claim 7 in which said master gear is operatively connected to said main shaft.

9. The device according to claim 7 which includes spring loaded shuttle valve means also in said body portion and situated between said brake system and said conduit extending to said brake system.

10. The device according to claim 8 which includes spring loaded shuttle valve means also in said body portion and situated between said brake system and said conduit extending to said brake system.

No references cited.

EUGENE G. BOTZ, *Primary Examiner.*